(12) United States Patent
Gao et al.

(10) Patent No.: US 12,541,526 B2
(45) Date of Patent: Feb. 3, 2026

(54) GENERIC FIND FUNCTION FOR ENABLING CURSOR-BASED PAGINATION

(71) Applicant: Oracle International Corporation, Redwood Shores, CA (US)

(72) Inventors: Chen Gao, Issaquah, WA (US); Guangkun Li, Lynnwood, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/907,883

(22) Filed: Oct. 7, 2024

(65) Prior Publication Data

US 2026/0003876 A1 Jan. 1, 2026

Related U.S. Application Data

(60) Provisional application No. 63/666,007, filed on Jun. 28, 2024.

(51) Int. Cl.
| | |
|---|---|
| *G06F 17/00* | (2019.01) |
| *G06F 7/00* | (2006.01) |
| *G06F 16/2457* | (2019.01) |
| *G06F 16/248* | (2019.01) |

(52) U.S. Cl.
CPC ...... *G06F 16/24578* (2019.01); *G06F 16/248* (2019.01)

(58) Field of Classification Search
CPC .................. G06F 16/24578; G06F 16/248

USPC .......................................................... 707/723
See application file for complete search history.

(56) References Cited

U.S. PATENT DOCUMENTS

| | | | | |
|---|---|---|---|---|
| 7,496,898 | B1 * | 2/2009 | Vu ........................ | G06F 9/4484 714/39 |
| 2012/0084754 | A1 * | 4/2012 | Ziegler ............... | G06F 11/3696 717/124 |
| 2015/0066907 | A1 * | 3/2015 | Somaiya ............... | G06F 3/0485 707/722 |
| 2024/0220485 | A1 * | 7/2024 | Gisby ................. | G06F 16/2438 |
| 2024/0220559 | A1 * | 7/2024 | Gisby ................. | G06F 16/9538 |

* cited by examiner

*Primary Examiner* — Pavan Mamillapalli
(74) *Attorney, Agent, or Firm* — Invoke

(57) ABSTRACT

Techniques for enabling cursor-based navigation of query results for any set of database records are described herein. One or more embodiments provide a generic find function for database applications, particularly, to facilitate cursor-based pagination of any query results. The generic find function returns, to the application, both a cursor object that points to a set of query results and a token for tracking the cursor's position while the application user navigates the query results. Specifically, the generic find function is part of an application framework that accepts, as input, a search parameter from an application user and identifies an appropriate pre-defined filter and a set of database-agnostic query parameters that map to the search parameter. The appropriate pre-defined filter may include a matching filter field value. The database application then calls the generic find function to build a query using the pre-defined filter and the set of query parameters.

24 Claims, 7 Drawing Sheets

USER INTERFACE https://www.framework.com/database_app/search/

Search Request

| Filter Key(s) | | | | SortBY Field | | | 10 | Results per page |
|---|---|---|---|---|---|---|---|---|
| | FIELD NAME | Val | Op | | FIELD NAME | Order | MAX | Pages |
| ✓ | ClientID | CL-0001 | IN | ✓ | ProcessID | DSC | | |

RUN

Search Results — 352B

| ClientID | CL-0001 | Record No. 1 of 30 | Prepared by | EP-0001 | Date | 2/26/2024 |
|---|---|---|---|---|---|---|
| ProcessID | | Task-0001 | Approved by | USER1 | Date | 5/26/2024 |
| ClientID | CL-0001 | Record No. 11 of 30 | Prepared by | EP-0001 | Date | 2/26/2024 |
| ProcessID | | Task-0001 | Approved by | USER1 | Date | 5/26/2024 |
| ClientID | CL-0001 | Record No. 21 of 30 | Prepared by | EP-0001 | Date | 2/26/2024 |
| ProcessID | | Task-0001 | Approved by | USER1 | Date | 5/26/2024 |
| ClientID | CL-0001 | Record No. 2 of 30 | Prepared by | EP-0001 | Date | 2/26/2024 |
| ProcessID | | Task-0002 | Approved by | USER1 | Date | 5/26/2024 |
| ClientID | CL-0001 | Record No. 12 of 30 | Prepared by | EP-0001 | Date | 2/26/2024 |
| ProcessID | | Task-0002 | Approved by | USER1 | Date | 5/26/2024 |
| ClientID | CL-0001 | Record No. 22 of 30 | Prepared by | EP-0001 | Date | 2/26/2024 |
| ProcessID | | Task-0002 | Approved by | USER1 | Date | 5/26/2024 |
| ClientID | CL-0001 | Record No. 3 of 30 | Prepared by | EP-0001 | Date | 2/26/2024 |
| ProcessID | | Task-0003 | Approved by | USER1 | Date | 5/26/2024 |

⋮

| ClientID | CL-0001 | Record No. 4 of 30 | Prepared by | EP-0001 | Date | 2/26/2024 |
|---|---|---|---|---|---|---|
| ProcessID | | Task-0004 | Approved by | USER1 | Date | 5/26/2024 |

|◄ 1 ———————————————— Page ———————————————— 10 ►|

GENERIC FIND FUNCTION FOR ENABLING CURSOR-BASED PAGINATION

INCORPORATION BY REFERENCE; DISCLAIMER

Each of the following applications are hereby incorporated by reference: Application No. 63/666,007 filed on Jun. 28, 2024. The applicant hereby rescinds any disclaimer of claims scope in the parent application(s) or the prosecution history thereof and advises the USPTO that the claims in the application may be broader than any claim in the parent application(s).

TECHNICAL FIELD

The present disclosure relates to database systems. In particular, the present disclosure relates to software applications and services for the database systems.

BACKGROUND

Software application developers, specifically those requiring access to a database system for handling large amounts of structured and/or unstructured data, may find suitable a consistent programming model for data access while still retaining the special traits of an underlying database system. Although some application frameworks have been used to create production-ready web applications with default configurations, code libraries, and powerful interfaces to the underlying database system, to avail such a programming model would require substantial amounts of code to be written by the application developers.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 3A-3D are each illustrative of a user interface for submitting database-agnostic query parameters and displaying cursor-based pagination query results in accordance with one or more embodiments.

DETAILED DESCRIPTION

Figure 1:
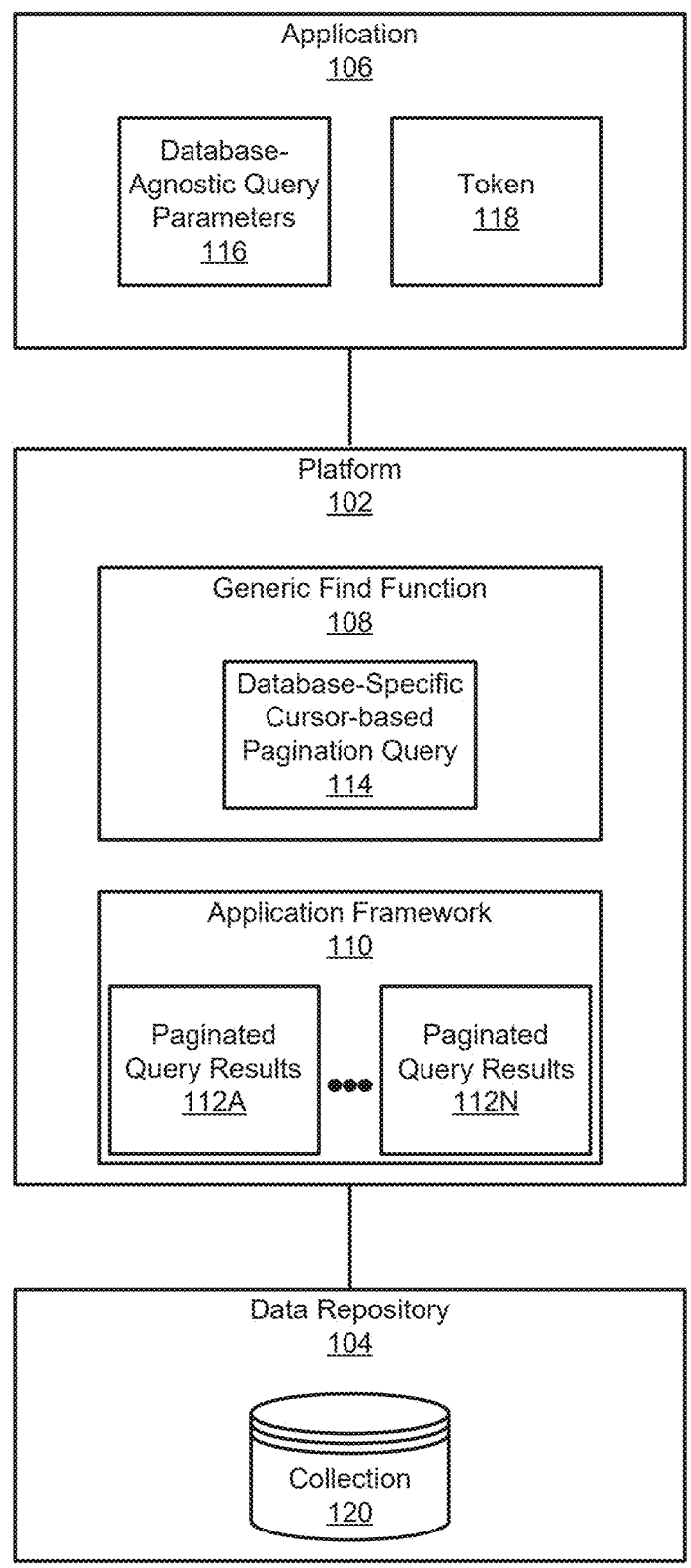
FIG. 1 illustrates a system in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. APPLICATION DEVELOPMENT AND DEPLOYMENT ARCHITECTURE
3. ENABLING CURSOR-BASED PAGINATION
4. EXAMPLE EMBODIMENT
5. COMPUTER NETWORKS AND CLOUD NETWORKS
6. MICROSERVICE APPLICATIONS
7. HARDWARE OVERVIEW
8. MISCELLANEOUS; EXTENSIONS

1. General Overview

One or more embodiments execute a generic find function as part of an application development and deployment platform. Application developers often use such a platform to create/instantiate microservices to perform database operations and then, use those microservices to create database applications. The generic find function can operate as an Internet-facing microservices Application Programming Interface (API) in a layer positioned between a database application and the database application's microservices architecture. While the microservices architecture is capable of searching information stored across sets of database records by running database queries, the same microservices architecture has limitations with respect to returning cursor-based pagination query results. In some embodiments, the microservices architecture is incapable of returning the cursor-based pagination query results, for example, without first receiving a database-specific cursor-based pagination query object.

As described in further detail below, the generic find function enhances the search capabilities of the database application by enabling cursor-based pagination through database-agnostic query parameters and removing the requirement for the database-specific cursor-based pagination query object. One or more embodiments configure the database-agnostic query parameters to map to components for building a suitable query object. To qualify as a cursor-based pagination query, the database-agnostic query parameters allow the generic find function to handle the filtering and sorting of a set of database records. The database-agnostic query parameters include parameters for filtering the set of database records and then, sorting the filtered set of database records. One or more embodiments can determine whether an initial user-selected sortby field properly arranges the sorted and filtered set database records. If not, the generic find function can add a second system-selected sortby field to correct the sorted and filtered set of database records.

As one advantage, the application developers behind the database application do not need to codify the extensive building operations for each database-specific cursor-based pagination query object, thereby reducing development cost and time.

As another advantage, cursor-based pagination overcomes the challenges accompanying alternative pagination techniques such as offset-based pagination.

The generic find function returns, to the database application, both a cursor object that points to a set of query results and a token for tracking the cursor's position while the application user navigates the query results. As yet another advantage, when the database application provides the token in a service call to move to a next page of the paginated query results, the generic find function can use the token to locate the same database-specific cursor-based pagination query results and determine the cursor's new position based on the cursor current position.

One or more embodiments described in this Specification and/or recited in the claims may not be included in this General Overview section.

2. Application Development and Deployment Architecture

FIG. 1 illustrates a system 100 in accordance with one or more embodiments. As illustrated in FIG. 1, system 100 includes a platform 102, a data repository 104, and an application 106. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 5, titled "Computer Networks and Cloud Networks."

In one or more embodiments, a platform 102 refers to a set of integrated technologies, which may be collectively known as an application development and deployment platform, that enables application developers to build and deploy database applications such as the application 106 in a consistent way across cloud computing environments. One or more embodiments of the platform 102 include a generic find function 108 and an application framework 110 to operate as a connector between the application 106 and the data repository 104.

The data repository 104, in general, stores database records for the platform 102 to serve its application users. As illustrated in FIG. 1, the data repository 104 includes a collection 120, an example database object, for storing a set of database records. In one embodiment, the data repository 104 is configured to act on any database operations that are directed towards the set of database records including updates/deletions/additions of at least one database record from the collection 120. The collection 120 refers to only one type of construct for database records; a number of alternatives for arranging and managing changes to the set of database records can easily be implemented by the data repository 104. In other embodiments, the data repository 104 stores the same set(s) of database records in a different structure such as a database table or an array of tables.

The application framework 110 generally refers to the microservices architecture described herein. A goal for the application framework 110 is to facilitate application development such that the application developers do not need to create extensive code. In furtherance of that goal, the generic find function 108 can be coupled to the application framework 110, for instance, as a top layer or wrapper class, according to some embodiments. The generic find function 108 exposes a RESTful API that is configured to communicate with the application 106 and processes database queries on behalf of the application 106 as explained herein.

One or more embodiments provide a number of advantages and enhancements to application development, in general, and to the application 106, in particular. For instance, application developers can use one or more embodiments to execute cursor-based pagination queries and avoid having to develop the substantial code required for the tedious query building operations behind executing each cursor-based pagination query. As a replacement for the tedious query building operations, application developers can instead configure their applications to invoke the generic find function 108 in its programming and then proceed to make advantageous use of cursor-based pagination.

One or more embodiments of the generic find function 108 enhance the application framework 110, for example, by simplifying cursor-based pagination navigation of database records. A database application, when interacting with multiple databases, can implement a search feature with cursor-based pagination by calling the generic find function 108 and passing a set of database-agnostic query parameters, thereby eliminating the need for the developer to write specific application code for searching each database. Therefore, combining the generic find function 108 and the application framework 110 considerably reduces the total development time and cost.

To further illustrate by way of example, a conventional find function searches a given dataset for a first value that matches one or more search conditions and if found, returns a memory location or a pointer to the first matching value. One example difference between the generic find function 108 and conventional find functionality is that the application 106 is required to build each database-specific query object in order to use the conventional find function, whereas the generic find function 108 builds the database-specific query object on behalf of the application 106.

As described in detail below, various embodiments leverage the generic find function 108 for the application framework 110 to serve cursor-based pagination query results—such as pagination query results 112A-112N (hereinafter referred to as the pagination query results 112)—to the application 106. The pagination query results 112 generally refer to a set of database records divided amongst a fixed number of pages. The set of database records may each include information that matches one or more query criterion established by the generic find function 108 on behalf of the application 106. One or more embodiments define each query criterion using a pre-defined filter object and database record field values that are provided, in a search request, by users of the application 106. To qualify as cursor-based pagination, one or more embodiments sort the set of database records before dividing them into separate pages. Sorting the set of database records allows a cursor object to reference a specific record in (a page of) the pagination query results 112 without losing that record's position amongst the other database records. One or more embodiments store at least one page of the paginated query results 112 in a sort object that is subsequently returned to the application 106.

In one embodiment, the generic find function 108 generates a database-specific cursor-based pagination query 114 in response to receiving from the application 106 a set of database-agnostic query parameters 116 and then applies the database-specific cursor-based pagination query 114 to a set of database records. By generating the database-specific cursor-based pagination query 114 and requesting that the application framework 110 retrieve and sort any matching database records, the generic find function 108 can provide the application 106 with at least a page of the pagination query results 112 commensurate with the database-agnostic query parameters 116. In response to receiving the matching database records, the generic find function 108 returns a contiguous subset of those database records to the application 106. One parameter of the set of database-agnostic query parameters 116 may set a fixed number of matching database records to return in a single page of the pagination query results 112.

One or more embodiments return to the application 106 a token 118 that is representative of the database-specific cursor-based pagination query 114 and an object comprising a specific page (e.g., a first page) of the paginated query results 112. An example page of the paginated query results 112 may set forth information describing each of a fixed number of database records including data from specific fields of one or more database records. One or more embodiments of the token 118 serve as a placeholder for a cursor object pointing to a particular database record in the paginated query results 112. One example of the token 118 retains the set of database-agnostic query parameters 116 for use in navigating between pages of the paginated query results 112. In one embodiment, the token 118 stores a last sortby field value or a last unique value set of the example page in the list of paginated query results 112.

In one embodiment, the generic find function 108 receives the token 118 in a function call operative to navigate to a next page or a previous page of the paginated query results 112 and proceeds to return, to the application 106, a cursor object corresponding to the next page of the paginated query results 112 or a cursor object corresponding to the previous page of the paginated query results 112. In addition to the cursor object corresponding to the previous page or the next page, the generic find function can also return a set of database records from the previous page of the paginated query results 112 or a set of database records from the next page of the paginated query results 112.

Regardless of the database configuration that the data repository 104 implements for organizing database records, the generic find function 108 can build an appropriate query object to include an expression for retrieving sorted paginated query results, thus enabling cursor-based pagination on behalf of the application 106 for searching the collection 120. As described below in detail, the set of database-agnostic query parameters 116 generally specify the necessary information for building the database-specific cursor-based pagination query 114 for the data repository 104 but without specifying the database configuration therein.

One or more embodiments of the set of database-agnostic query parameters 116 allow the generic find function 108 to build database-specific cursor-based pagination queries as exemplified by the above-mentioned database-specific cursor-based pagination query 114. In one embodiment, the application 106 accepts, as input from the application user, a search request indicating at least a filter value for a valid field name of the stored set(s) of database records data records in the data repository 104. It should be noted that, although valid, the above field name in the search request is not required to be tied to the collection 120 or any query object associated the collection 120. The search request may further indicate a specific field operator for expressing a relationship between the filter value and the field name. As explained herein, the specific field operator may be of any well-defined operator type in the application framework 110. Using the combination of the valid field name, the user-provided filter value, and the field operator, the application 106 identifies one or more of the set of database-agnostic query parameters 116 that map to the filter value. The one or more identified database-agnostic query parameters 116 may be necessary for building an appropriate query object to represent the database-specific cursor-based pagination query 114 and to service the search request, for instance, by applying the appropriate query object to the collection 120.

Figure 3A:

Example parameters of the set of database-agnostic query parameters 116 may include a page limit parameter, a page identifier, a number of results per page parameter, a sort parameter, a filter parameter, and/or the like. The filter, sort, page limit, and/or sort order parameters may be defined by user input as illustrated in FIG. 3A. In general, the filter parameter includes at least one combination of a filter field name and filter value, such as in a filter key-value pair, and the sort parameter includes at least one sortby field name. In one embodiment, the page identifier can be set to indicate, by default, a first page as a starting page. However, the user can override the default first page by, for instance, entering a page number identifier to indicate a page number another starting page other than the first page.

One example of the filter parameter may be a pre-defined filter that sets forth a valid field name for a set a database records—otherwise known as a filter key—and an input filter value. The pre-defined filter may also identify a field operator for the filter key-value pair. In some embodiments, a hashmap object stores the pre-defined filter as a filter object or, simply, the filter key-value pair. The application 106 may employ the hashmap object and a plurality of pre-defined filters that comprise pre-determined combinations of valid field names and field values and/or field operators. The hashmap object can be configured to identify the above pre-defined filter as a valid filter amongst the plurality of pre-defined filters for generating the database-specific cursor-based pagination query 116. In one embodiment, the application 106 processes the plurality to select a particular pre-defined filter for having a field value matching the input filter value provided by the user and then, modifies the hashmap object to identify the particular pre-defined filter. It should be noted that the hashmap object is not required to be tied to the collection 120 or any query object associated the collection 120.

In one embodiment, the application 106 includes specification code for the above-mentioned plurality of pre-defined filters. Upon receiving a search parameter from the users of the application 106 who desire searching the collection 120, the application 106 sets the filter parameter to identify an appropriate pre-defined filter that maps to the search parameter, which may be a character string or a mathematical value. The application then adds the search parameter as a filter field value to the filter object. The filter field name may correspond to multiple sets of database records; the generic find function 108 is configured to select a specific set of database records to search based on the filter field name and other information. The application 106 then calls the generic find function 108 to build a database-specific cursor-based pagination query object 114 using the above filter object, at least one sortby field name, and the remaining parameters of the set of database-agnostic query parameters 116.

In one or more embodiments, a data repository 104 is any type of storage unit and/or device (e.g., a file system, database, collection of tables, or any other storage mechanism) for storing data. Furthermore, a data repository 104 may include multiple different storage units and/or devices. The multiple different storage units and/or devices may or may not be of the same type or located at the same physical site. Furthermore, a data repository 104 may be implemented or executed on the same computing system as the platform 102. Additionally, or alternatively, a data repository 104 may be implemented or executed on a computing system separate from the platform 102. The data repository 104 may be communicatively coupled to the platform 102 via a direct connection or via a network.

Information describing the system 100 may be implemented across any of components within the system 100. However, this information is illustrated within the data repository 104 for purposes of clarity and explanation.

In one or more embodiments, the generic find function 108 refers to hardware and/or software configured to perform operations described herein for enabling cursor-based pagination for database applications. Examples of operations for enabling cursor-based pagination for database applications are described below with reference to FIG. 2.

In an embodiment, the generic find function 108 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

In one or more embodiments, a graphical user interface (GUI) generated by the application 106 refers to hardware and/or software configured to facilitate communications between a user and the application 106. The GUI renders user interface elements and receives input via user interface elements. Examples of other interfaces include a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of the above-mentioned GUI are specified in different languages. The behavior of user interface elements is specified in a dynamic programming language such as JavaScript. The content of user interface elements is specified in a markup language, such as hypertext markup language (HTML) or XML User Interface Language (XUL). The layout of user interface elements is specified in a style sheet language such as Cascading Style Sheets (CSS). Alternatively, the above-mentioned GUI is specified in one or more other languages, such as Java, C, or C++.

3. Enabling Cursor-Based Pagination

Figure 2:
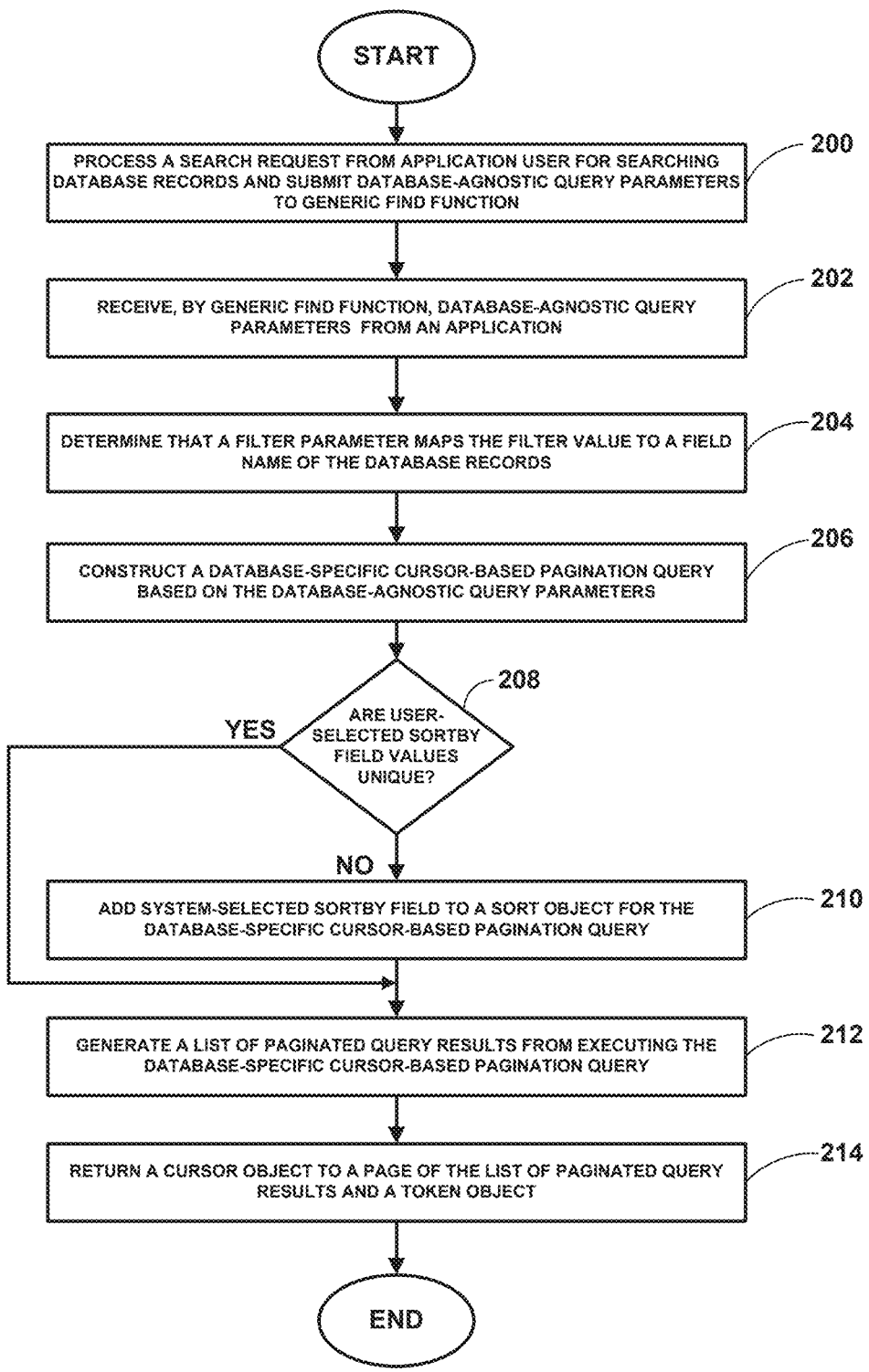
FIG. 2 illustrates an example set of operations for a system enabling cursor-based pagination in accordance with one or more embodiments.

FIG. 2 illustrates an example set of operations for a system enabling cursor-based pagination in accordance with one or more embodiments. One or more operations illustrated in FIG. 2 may be modified, rearranged, or omitted. Accordingly, the particular sequence of operations illustrated in FIG. 2 should not be construed as limiting the scope of one or more embodiments.

In an embodiment, the system processes a search request from an application user and submits database-agnostic query parameters to a generic find function (Operation 200). As depicted in FIG. 1, the system includes a database application, such as the application 106, for application users to operate when performing searches on a set of databases records stored by the data repository 104. At a control level, the system includes an application development and deployment platform, such as the platform 102 of FIG. 1, to run programs (e.g., services) communicatively coupled with the data repository 104. In one embodiment, the system includes a generic find function, such as the generic find function 108 of FIG. 1, to operate with other programs of the platform, together forming a stack of programs on which the database application can submit search requests, execute database searches, and effectuate cursor-based pagination of any search results.

In an embodiment, the system receives the database-agnostic query parameters from the database application (Operation 202). In one embodiment, the generic find function receives the set of database-agnostic query parameters over a network. In one embodiment, the database-agnostic query parameters specify various parameter types, including a page limit parameter, a filter parameter, and a sort parameter, among others. In response to receiving the database-agnostic query parameters, the generic find function of the system extracts the filter parameter, identifies specific database(s) to query, and then builds a query object for execution by the application framework according to one embodiment. Using the remaining parameters, the generic find function of the system then updates the query object such that the application framework will interpret the query object as a legitimate cursor-based pagination query. Therefore, the query object is built to be compatible with the application framework and furthermore, capable of activating cursor-based pagination.

Instead of having the database application build each query, submitting the database-agnostic query parameters to the platform conserves more resources for an application developer, including deployment and development time typically allocated to writing the code. This is in part because having only the submitted database-agnostic query parameters, the system can automatically generate a suitable cursor-based pagination query and then complete the search request on behalf of the database application. By doing so, the application developer can avoid writing code for building multiple cursor-based pagination queries or a same cursor-based pagination query over multiple databases (e.g., multiple collections, tables, and/or the like). Writing such code can be tedious and time-consuming for any developer. Therefore, when compared to building a cursor-based pagination query at an application level, the database-agnostic query parameters operate as a beneficial alternative.

In an embodiment, the system determines that a filter parameter maps a value (e.g., a user-provided value) to a particular filter key of a specific set of database records (Operation 204). One example filter parameter may be a filter key-value pair comprising a filter field name (e.g., a date field) and a filter value for that field name (e.g., Jun. 7, 2024). Another example may combine the above filter key-value pair with an additional value for a filter field operator (e.g., in/on, less than/before, greater than/after, and/or the like). Yet another example may include a second filter-value pair comprising a second filter field name and a second filter value. Thus, the filter parameter may be a filter object comprised of multiple filter-value pairs. It should be noted that there are many alternatives to using a filter-value pair for the filter parameter.

In an embodiment, the system constructs a database-specific cursor-based pagination query based on the database-agnostic query parameters (Operation 206). As described herein, the database-agnostic query parameters can prompt, at the control level of the system, the generation of a suitable query object for completing the above-mentioned search request. One embodiment of the generic find function invokes the application framework to build each component of the query object. One example component known as a criterion includes a filter field name and a corresponding filter value of a filter parameter. To illustrate by way of example, the generic find function can use the filter parameter to identify a specific database table having a particular field name that matches (or otherwise corresponds to) the filter field name. Once identified, the generic find function defines the criterion component for filtering the specific database table and then adds the criterion component to update the query object.

In addition to the filter parameter, a sort parameter specifies a sortby field name for sorting cursor-based pagination query results. To qualify as a valid cursor-based pagination query, the generic find function adds the sortby field name as a sort object, another example component, to the query object. In one embodiment, the generic find function adds the sort object to the above query object by extracting a sort parameter, identifying at least one sortby field name to define a sort object, and updating the query object.

In one embodiment, the generic find function can request cursor-based paginated query results that enumerate a set of matching database records by passing the above query object to the application framework. In turn, the application framework executes a search of the specific database table and retrieves any database table entry that matches the criterion component; if one or more matching database table entries are identified, the generic find function receives a list of the matching database table entries and a cursor (object) pointing to a first database table entry. In another embodiment, if one or more matching database table entries are identified, the generic find function further requests that the application framework return a sorted list of matching database table entries.

The system determines if user-selected sortby field values within the cursor-based paginated query results are unique (Operation 208). In one embodiment, the user-selected sortby field values are column values of the above-mentioned matching database table entries from the specific database table. If the system determines that at least two user-selected sortby field values repeat (i.e., not all user-selected sortby field values are unique), the system proceeds to add a system-selected sort field to the sort object for the database-specific cursor-based pagination query (Operation 210). In one embodiment, the system constructs the sort object for executing a first sorting operation based on the user-selected sortby field values and a second sorting operation based on the system-selected sortby field values. The second sorting operation may be executed subsequent to executing the first sorting operation. The system can generate an updated query object that includes the sort object.

If, on the other hand, the system determines that all user selected sortby field values are unique, the system omits Operation 210 and proceeds to Operation 212, at which the system generates a list of paginated query results from executing the database-specific cursor-based pagination query. The system returns a cursor object to a page (e.g., a first page) of the list of paginated query results and a token object (Operation 214). In one embodiment, the cursor object may store at least a portion of the last database table entry in the page.

The token object generally represents the database-agnostic query parameters and can be used for storing a location of the cursor object. In one embodiment, the system can direct the generic find function to fetch a last database table entry of the first page in the list of paginated query results and store, in the token object, a first cursor object comprising a first sortby field value and a second sortby field value of the last database table entry if the first sortby field value is not unique. The database application therefore can use the token object to retrieve the second page of the list of paginated query results, for example, by submitting the token object to the generic find function in a function call operative to navigate directly to the second page of the list of paginated query results. The token object can be used to identify a next database table entry after the last database table entry on the first page. In one embodiment, the generic find function returns a second cursor object corresponding to the next database table entry, succeeding the last database table entry of the first cursor object, on the second page of the list of paginated query results. In one embodiment, the generic find function updates the list of paginated query results in response to the function call, for example, upon detecting a modification to the paginated query results (e.g., an addition or a removal of a database table entry).

4. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

FIGS. 3A-3D illustrate user interfaces for submitting database-agnostic query parameters and displaying cursor-based pagination query results in accordance with one or more embodiments. The system operating behind each user interface depicted in FIGS. 3A-3D includes a database application, such as the application 106 of FIG. 1, for an application user to operate when searching a set of database records stored by a data repository. The system further includes a computing device configured to run the database application and generate a GUI through which the application user enters input to and consumes output from the database application.

FIG. 3A, in particular, illustrates a user interface 300A on which a search feature 302 is presented to the application user for setting the database-agnostic query parameters in the above search request. The search feature 302 of FIG. 3A includes a number of GUI elements for presenting information describing the database-agnostic query parameters. The search feature 302 of FIG. 3A further includes a number of GUI elements for processing, from the application user, various input setting the database-agnostic query parameters.

In one embodiment, the search feature 302 includes separate controls (which may be known as drop-down boxes) for processing user input selecting respective filter keys labelled as FILTER FIELD NAME and FILTER FIELD OPERATOR as well as another control for processing user input entering a value for the selected FILTER FIELD NAME. Together, the selected filter keys, when combined with the filter value, define a filter parameter of the database-agnostic query parameters. As illustrated in FIG. 3A, the search feature 302 indicates that the application user has made selections of FILTER FIELD NAME "ClientID" and FILTER FIELD OPERATOR "IN" and then, entered "CL-0001" as a filter value for the filter keys, particularly the "ClientID" field name. In turn, the database application generates a filter object to store at least one filter key(s)-value pair and then designates that filter object to operate as the filter parameter of the database-agnostic query parameters.

In one embodiment, the search feature 302 includes a control that when activated by the application user, selects a user-selected sortby field name labelled "SORTBY FIELD NAME." The depiction of the search feature 302 in FIG. 3A indicates that the application user has selected "ProcessID" as the user-selected sortby field. The user-selected sortby field can be used to define a sort parameter of the database-agnostic query parameters.

In one embodiment, the search feature 302 further includes a control (which may be known as a radio button) for selecting either a default limit or a custom limit to set as a page limit parameter of the database-agnostic query parameters. As further illustrated, the search feature 302 indicates that the application user has made a selection of the default page limit parameter for the database-agnostic query parameters.

In one embodiment, the search feature 302 further includes a control (which may be known as a scroll box) for selecting a SORT ORDER to be used as a sort order parameter of the database-agnostic query parameters. As illustrated, the search feature 302 indicates that the application user has made a selection of a descending sort order.

Upon activation of the "RUN" button, the search feature 302 passes the above-mentioned filter, sort, page limit, and sort order parameters in a search request to functionality within the database application for processing search requests. Such functionality may be configured to receive the search request, submit the above-mentioned database-agnostic query parameters to a generic find function as described herein, and in response, receive search results in the form of a page of cursor-based paginated query results to display as depicted in FIG. 3C.

Figure 3B:
Figure 3D:
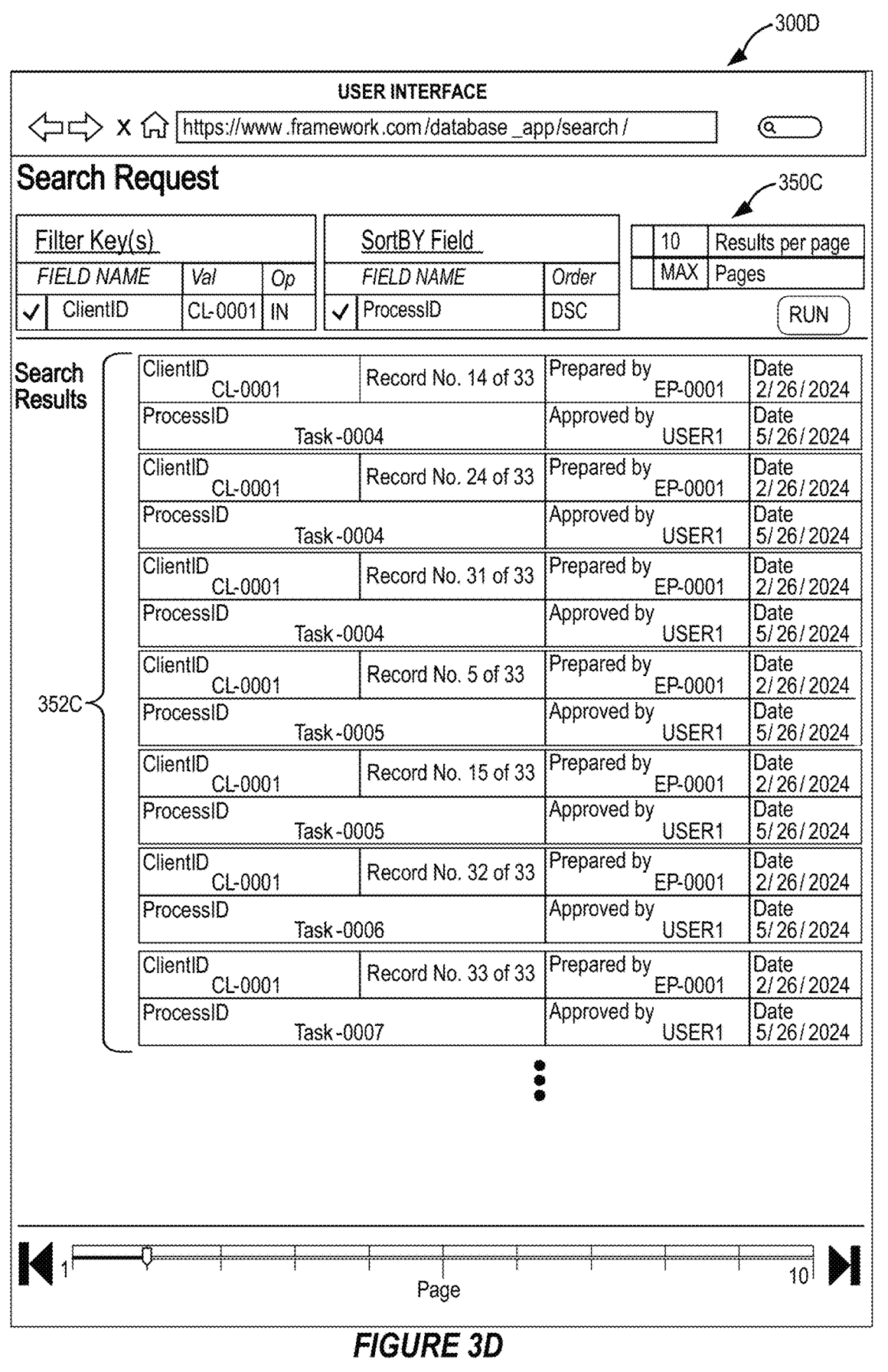

FIGS. 3B-3D in general demonstrate how submitting the database-agnostic query parameters to the generic find function enhances the search capabilities of the database application when compared to building the cursor-based pagination query in its application code. For the sake of clarity, FIG. 3B presents example database records that are to be searched by the generic find function. In one embodiment, the generic find function generates the cursor-based pagination query using the database-agnostic query parameters, obtains matching database records from the data repository, and then returns at least some matching database records to the database application. With respect to FIGS. 3C-3D, each presents a single page of the cursor-based pagination query results.

With respect to a user interface 300B depicted in FIG. 3B, a search request panel 350A specifies the database-agnostic query parameters that have been provided by the application user via the user interface 300A depicted in FIG. 3A. The search results panel 352A presents a page of an unfiltered set of database records from the data repository. The unfiltered database records are not sorted according to the user-selected sortby field "ProcessID" but are sorted according to "Record No." field. The search request panel 350A indicates that at least the filter parameter and the sort parameter are inactivate and therefore, are not being used to filter or sort any database records.

FIG. 3B further illustrates that the unfiltered set of database records follow a pattern of performing consecutive tasks Task-0001, Task-0002, Task-0003, Task-0004, and Task-0005 for respective clients CL-0001 and CL-0002. Given that the default page limit parameter sets a maximum of 10 results per page, FIG. 3B depicts database records numbered 1 to 10 in the first page of the paginated query results. Although only the first 10 database records are shown in FIG. 3B, it should be understood that this pattern repeats for the next 20 records.

Using the search capabilities of the database application, the application user can direct the database application to submit, to the generic find function, a search request for searching at least the unfiltered set of database records depicted in FIG. 3B. The application user can re-instate both the filter and sort parameters in the search request panel 350A and re-run the search request by activating checkbox controls for the filter field "ClientID" and the user-selected sortby field "ProcessID" and then depressing the "RUN" button control on the user interface 300B. Example search results based on above the search request are presented by FIGS. 3C-3D.

FIG. 3C illustrates a user interface 300C for displaying database records that have been returned in a first page of the cursor-based paginated query results. A search request panel 350B indicates that the filter key-value pair of "ClientID"-"CL-0001" and the user-selected sortby field "ProcessID" are now both active. A search results panel 352B on which the first page of the paginated query results is depicted further demonstrates that the user-selected sortby field "ProcessID" does not include all unique values given that some values repeat (e.g., Task-0001). To qualify for cursor-based pagination, the generic find function adds a second sortby field to sort the matching database records. The generic find function can select "Record No." as the second sortby field (i.e., a system-selected sortby field) after confirming that the "Record No." values are unique. The generic find function also returns a cursor object pointing to a last database record in the search results panel 352B. By doing so, the search results enumerated in FIG. 3C fully qualify as the first page of cursor-based pagination query results.

In one embodiment, the cursor object includes a reference or a pointer to a last database record on the first page of the cursor-based pagination query results. The cursor object corresponds with the user-selected sortby field or both the user-selected sortby field and the system-selected sortby field according to one or more embodiments. If one or more user-selected sortby field values are not unique, the database application may provide inaccurate query results. For instance, if the cursor object points to a user-selected sortby field value and there are two database records with that value, the database application may omit database records with that value. In one embodiment, the user-selected sortby field or both the user-selected sortby field and the system-selected sortby field form an index for the paginated query results.

FIG. 3D depicts a second page of the cursor-based pagination query results. The second page is presented on search results panel 352C in response to the application user input directing the database application to navigate to a next page. Upon receiving the application user's directive, the generic find function returns the next 10 database records after the cursor object, which points to the last database record of the previous (first) page of the cursor-based pagination query results. By doing so, the generic find function avoids omitting any of the database records in the cursor-based pagination query results. Database records can be removed or added to the first page without changing the second page of the cursor-based pagination query results.

As illustrated in FIG. 3D, Record Nos. 31, 32, and 33 have been added as new database records to the collection, and Record No. 25 has been subtracted from the collection without negatively affecting either the first page or the second page of the cursor-based paginated query results. The cursor object described above enables a stable ordering of these results. Hence, the generic find function avoids the drawbacks of alternative methods for handling database searches and search results such as offset-based pagination.

To illustrate by way of comparison, consider an example where offset-based pagination is implemented instead of cursor-based pagination. In this example, changes to any of the database records or a different sort order can render incorrect the offset (e.g., ten (10)) and disrupt the search results. Thus, another challenge with offset-based pagination is that the database application needs to scan skipped records before getting to the requested data. This means that on the second page of this example, the database application will still scan items numbered 1 to 10 before returning results for items numbered 11 to 20. Changes to the database records may cause the query results to also change. Furthermore, as the offset increases, the number of records to scan increases.

Another challenge with offset-based pagination is that if there are additions or removals to the set of database records during pagination, the database application may inadvertently omit certain records. If, in the above example, items numbered 4 and 5 were removed while navigating between the first page and the second page, the second page will only show items numbered 13 to 20 instead of items numbered 11 to 20. This is because the offset was set at 10, and that offset directs the database application to skip the first 10 items, which are items numbered 1, 2, 3, 6, 7, 8, 9, 10, 11, and 12. Similarly, when new items are added or when the sort order parameter changes (e.g., from descending to ascending), the database application may omit certain records from the query results.

The above challenges are solved by implementing cursor-based pagination because the cursor object operates as an exact pointer to the last or previous item. When compared to offset-based pagination, the cursor object allows the database application to directly jump to the correct "position" of the query results notwithstanding the addition or removal of any database records.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis.

Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally, or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may additionally, or alternatively, provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally, or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
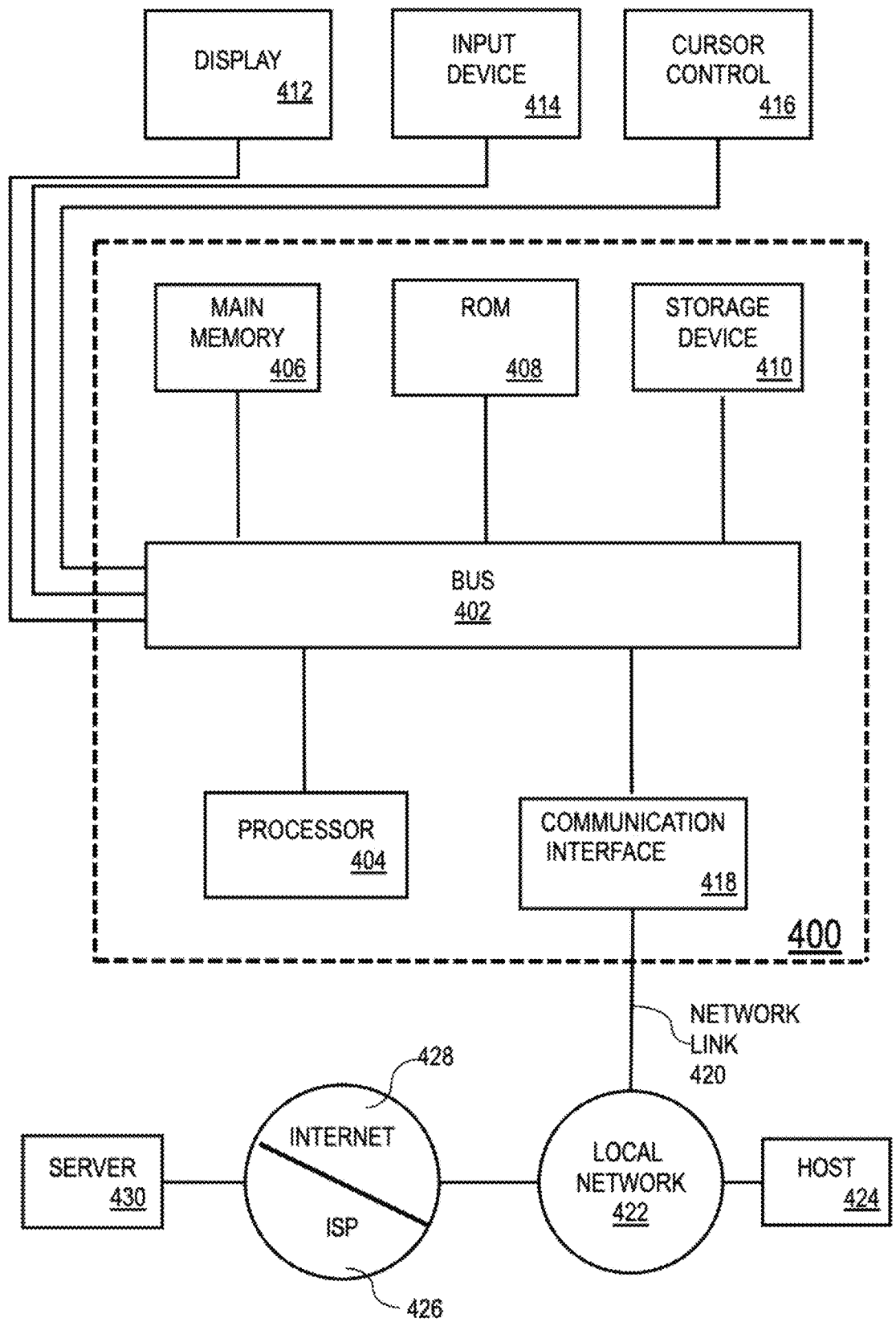
FIG. 4 shows a block diagram that illustrates a computer system in accordance with one or more embodiments.

For example, FIG. 4 is a block diagram that illustrates a computer system 400 upon which an embodiment of the disclosure may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or a Solid State Drive (SSD) is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

8. Miscellaneous; Extensions

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions which, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. One or more non-transitory computer readable media comprising instructions which, when executed by one or more hardware processors, cause performance of operations comprising:
receiving, by a find function of a database application framework, a set of database-agnostic query parameters from a requesting process, wherein the requesting process is executed independently of the find function;
transforming, by the find function, the set of database-agnostic query parameters into a database-specific cursor-based pagination query, at least by:
determining, by the find function, that a filter key-value pair, in the set of database-agnostic query parameters, maps a filter value provided by an application user to a field name in a set of database records; and
constructing, by the find function, the database-specific cursor-based pagination query from the filter key-value pair;
generating, based on the set of database-agnostic query parameters, a list of paginated query results from executing the database-specific cursor-based pagination query on the set of database records; and
returning, by the find function, to the requesting process, a cursor object corresponding to a page of the list of paginated query results.

2. The non-transitory media of claim 1, wherein the find function receives the set of database-agnostic query parameters over a network.

3. The non-transitory media of claim 1, wherein the cursor object comprises at least a portion of a database record of a first page of the list of paginated query results.

4. The non-transitory media of claim 1 further comprising returning, by the find function, to the requesting process, a token object comprising the set of database-agnostic query parameters and the cursor object.

5. The non-transitory media of claim 4, wherein the token object further comprises a last sortby field value or a last unique value set of the page in the list of paginated query results.

6. The non-transitory media of claim 4, wherein returning the token object further comprises responsive to fetching a last record of the first page in the list of paginated query results, storing, in the token object, a first sortby field value and a second sortby field value of the last record if the first sortby field value is not unique.

7. The non-transitory media of claim 4 further comprising responsive to receiving, from the requesting process, the token object in a function call operative to navigate to a next page or a previous page of the list of paginated query results: returning, by the find function, to the requesting process, a cursor object corresponding to the next page of the list of paginated query results or a cursor object corresponding to the previous page of the list of paginated query results.

8. The non-transitory media of claim 7 further comprising returning, by the find function, to the requesting process, a set of database records from the previous page of the list of paginated query results or a set of database records from the next page of the list of paginated query results.

9. The non-transitory media of claim 4 further comprising:
wherein the token object comprises a first cursor object corresponding to a last record on a first page of the list of paginated query results;
responsive to receiving, from the requesting process, the token in a function call that is operative to navigate to a second page of the list of paginated query results, generating, by the find function, an updated list of paginated query results, based on the token, in response to a modification to the set of database records; and
returning, by the find function, to the requesting process, a second cursor object corresponding to a next record, succeeding the last record of the first cursor object, on a second page of the updated list of paginated query results.

10. The non-transitory media of claim 9, wherein the modification comprises an addition of a record to or a subtraction of a record from the list of paginated query results.

11. The non-transitory media of claim 1, wherein the database-specific cursor-based pagination query comprises a sort object configured to generate a sorted list of paginated query results according to an index.

12. The non-transitory media of claim 11, wherein the index comprises at least one sortby field name.

13. The non-transitory media of claim 11, wherein the index comprises a user-selected sortby field name and a system-selected sortby field name.

14. The non-transitory media of claim 1, wherein the database-agnostic query parameters comprise at least one sortby field parameter, a filter parameter, a sort order parameter, a page limit, and a page identifier.

15. The non-transitory media of claim 14, wherein the filter parameter identifies a field operator for application to the filter key-value pair.

16. The non-transitory media of claim 14, wherein the filter parameter comprises a hashmap object for storing the filter key-value pair.

17. The non-transitory media of claim 16, wherein the hashmap object is configured with a set of filters comprising pre-defined combinations of field values and field operators.

18. The non-transitory media of claim 17, wherein the hashmap object is configured to identify a valid filter amongst the set of filters for generating the database-specific cursor-based pagination query, wherein the valid filter comprises a field value matching the filter value provided by the user.

19. The non-transitory media of claim 1, wherein constructing the database-specific cursor-based pagination query comprises adding, to a query object, the filter value as a criterion.

20. The non-transitory media of claim 1, wherein constructing the database-specific cursor-based pagination query comprises adding, to a query object, a criterion comprising a filter operation and the filter value that maps to the field name in the set of database records.

21. The non-transitory media of claim 1, wherein constructing the database-specific cursor-based pagination query comprises adding, to the query object, an expression for sorting the set of database records according to a sort order and a sortby field.

22. One or more non-transitory computer readable media comprising instructions which, when executed by one or more hardware processors, cause performance of operations comprising:
receiving a query that specifies a user-selected sortby field;
determining that values for the user-selected sortby field are not unique;
responsive to determining that the values are not unique, determining a system-selected sortby field for sorting values subsequent to sorting the values for the user-selected sortby field;

constructing a sort object comprising the user-selected sortby field for executing a first sorting operation and the system-selected sortby field for executing a second sorting operation subsequent to executing the first sorting operation;

generating a cursor-based pagination query from the sort object and a filter value-pair comprising a field name and a field value; and generating a sorted list of paginated query results from executing the cursor-based pagination query on the set of database records.

23. The non-transitory media of claim 22, wherein determining that values for the user-selected sortby field are not unique comprises analyzing metadata associated with the user-selected sortby field to determine that the user-selected sortby field does not require unique values.

24. The non-transitory media of claim 22 further comprising:

receiving a second query that specifies a second user-selected sortby field;

determining that values for the second user-selected sortby field are unique;

responsive to determining that the values are unique, constructing a second sort object comprising the second user-selected sortby field for executing a third sorting operation without using any system-selected sortby field;

generating a second cursor-based pagination query from the second sort object and the filter value-pair comprising a field name and a field value; and generating a second sorted list of paginated query results from executing the cursor-based pagination query on the set of database records.

* * * * *